(12) United States Patent
Huitema

(10) Patent No.: US 8,065,339 B2
(45) Date of Patent: *Nov. 22, 2011

(54) HIERARCHY MODIFICATION

(75) Inventor: John S. Huitema, Arlington, MA (US)

(73) Assignee: Verizon Laboratories Inc., Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/683,834

(22) Filed: Jan. 7, 2010

(65) Prior Publication Data

US 2010/0106726 A1 Apr. 29, 2010

Related U.S. Application Data

(63) Continuation of application No. 11/474,996, filed on Jun. 27, 2006, now Pat. No. 7,657,547.

(51) Int. Cl.
*G06F 17/30* (2006.01)

(52) U.S. Cl. .......................................... 707/802; 715/853
(58) Field of Classification Search .................. 707/609, 707/705, 769, 791, 802, 821; 706/15, 45; 715/209, 853, 854
See application file for complete search history.

(56) References Cited

U.S. PATENT DOCUMENTS 5,983,224 A * 11/1999 Singh et al. ............................ 1/1
6,460,025 B1 * 10/2002 Fohn et al. ...................... 706/45

* cited by examiner

*Primary Examiner* — Fred I Ehichioya

(57) ABSTRACT

A hierarchy of nodes is created, each node being one of associated with an item retrieved according to a condition and associated with a category of information including the item. It is determined whether at least one of the nodes is redundant in the hierarchy. The at least one of the nodes is pruned from the hierarchy if the at least one of the nodes is redundant.

12 Claims, 5 Drawing Sheets

300'

302a — Shopping
    308a — ○ Coin & Stamp Dealers & Supplies
    308b — ○ Antique Coin Dealers
302b — Industry & Agriculture
    306c — ○ Coin Dealers' Supplies Wholesale
    310 — ○ Coin & Token Manufacturers

FIG. 4

HIERARCHY MODIFICATION

CROSS REFERENCE TO RELATED APPLICATIONS

This application is a continuation of U.S. patent application Ser. No. 11/474,996, filed on Jun. 27, 2006, which is hereby incorporated by reference in its entirety.

BACKGROUND INFORMATION

Information retrieved from electronic databases, e.g., information displayed on the Internet, such as by way of the World Wide Web, may be organized and presented according to hierarchically arranged categories. For example, many web sites include "site maps" that display an organization of web pages in a web site according to a hierarchical index. Further, numerous known web sites allow users to search for items, such as items in a directory, and present search results in a hierarchy.

Displaying information in a flat list, with each element having a descriptive name, is one approach for displaying information. Such a layout generally takes up a minimum of vertical space on a graphical user interface such as a computer screen. However, this method has the disadvantage of being generally difficult to scan for relevant information due to the length of the descriptive names, which can be long or otherwise cumbersome. Additionally, a user will likely not be able to understand how various pieces of information are related in a simple list format, e.g., how each piece of information is classified in relation to the other pieces of information that may be displayed. Lists therefore generally require users to read through the entirety of the list, including the entire length of each descriptive name for each element. This may be particularly cumbersome for larger lists of information covering broad categories of interest.

An alternative to a "flat" list is displaying information in a hierarchy. In a hierarchical layout, information may generally be presented in a structure which shows relationships between various pieces of information by grouping elements together in categories and subcategories.

Displaying a hierarchy of information is generally useful for helping a user quickly understand how information is organized and which categories and subcategories of information in the hierarchy might be most beneficial and relevant. A user can generally scan higher-level categories in a hierarchically arranged list to decide which higher-level categories are most relevant, without having to look at every subcategory displayed in the hierarchy. However, displaying information hierarchically generally consumes a large amount of vertical space on any graphical user interface through which the searcher may be viewing a hierarchically arranged set of information, because a hierarchical arrangement generally requires a separate line of text for each category and subcategory presented. Information displayed in a hierarchy of information may therefore require excessive scrolling or additional sorting by a user, who may find it burdensome to view a lengthy and detailed hierarchy of information, and further may find it difficult to determine which information in the hierarchy is of greatest interest. Such difficulties are particularly acute where a large quantity of search results is presented in a hierarchy.

Accordingly, there is a need for the ability to provide for displaying information in a hierarchical arrangement that presents categories and sub-categories of information most likely to be of interest to a user, thereby facilitating the user obtaining information that is, or is likely to be, of the greatest interest. Further, it would be beneficial to present information to users in a hierarchical arrangement while consuming as little space as possible on a display so as to minimize the need for scrolling or additional sorting by users.

BRIEF DESCRIPTION OF THE DRAWINGS

FIG. 4 illustrates a portion of a graphical user interface showing a hierarchy of categories after modifying, according to an embodiment.

DETAILED DESCRIPTION OF THE PREFERRED EMBODIMENTS

Introduction

Information concerning categories and subcategories in a hierarchy that are relevant to a request for information may be displayed, while information concerning categories and subcategories that are of lesser or no relevance to requested information are omitted from a display, even when such information is included in search results or some other set of information provided in response to a request for information. For example, categories of information that in fact contain no information may be collapsed or eliminated, i.e., pruned, from a display of a hierarchy of information. Sub-categories that that have no siblings in a hierarchy, i.e., the sub-category is the only child of its parent category, may likewise be pruned from a display of a hierarchy of categories of information. Further, displayed categories and subcategories in a hierarchy may be displayed with a longer, more descriptive name to provide proper context in the absence of a portion of the original hierarchy. Such heuristics for pruning a hierarchical presentation of information, described in more detail below, advantageously render a presentation of hierarchically arranged information more efficiently for a user. A user is advantageously able to find quickly information of interest, without having to review information likely to be of less interest.

System Overview

Figure 1:
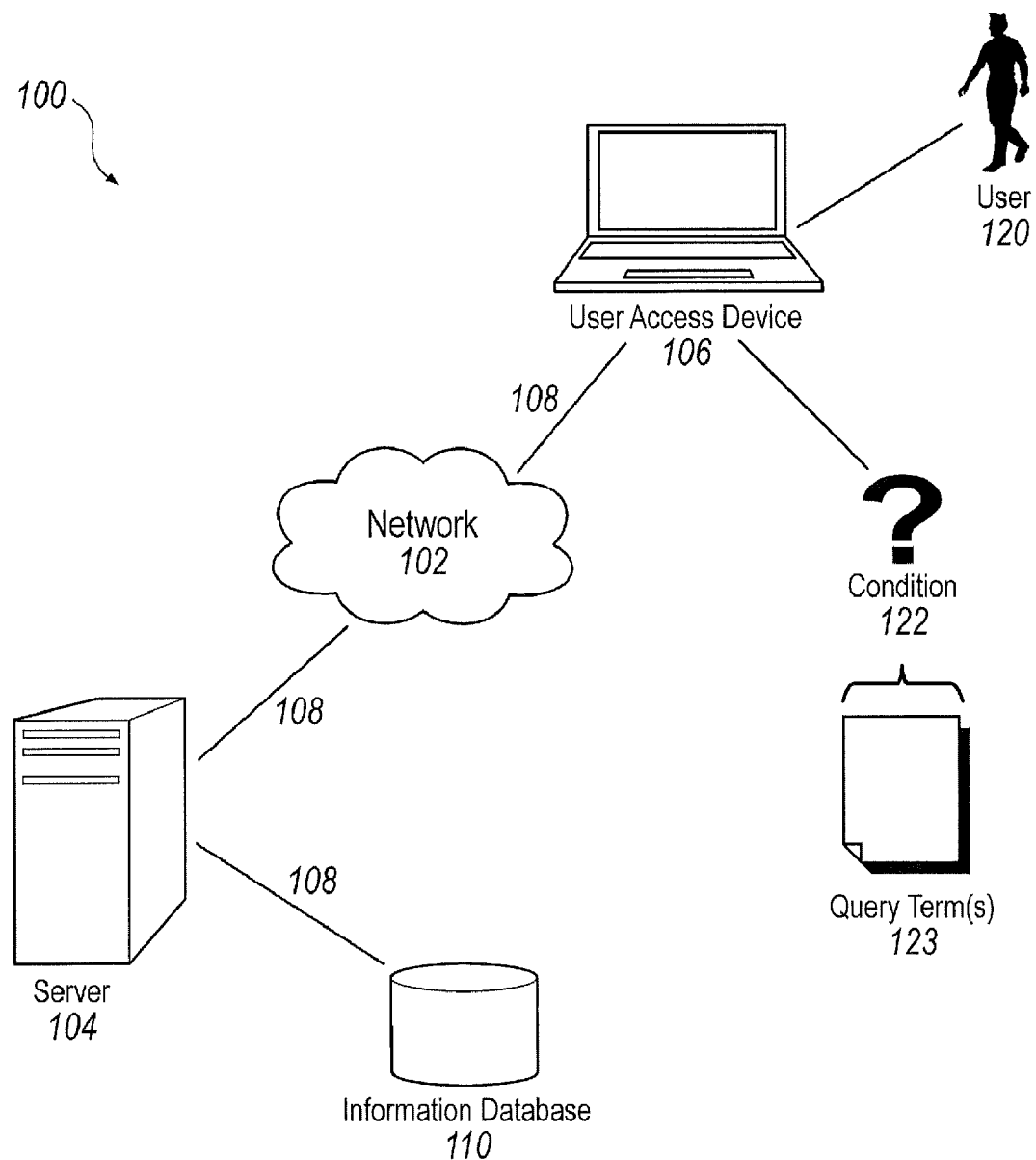
FIG. 1 illustrates an architecture of an information system, according to an embodiment.

FIG. 1 illustrates the architecture of a system for presenting information, according to an embodiment. Information system 100 includes a network 102 for providing communications between a server 104 and a user access device 106 via various connections 108. Connections 108 may include any number of well known connection technologies, including, for example, wires, wireless communication links, fiber optic cables, etc. Network 102 may represent any number of well known telecommunications or computer networks, including, for example, an intranet, a wide area network (WAN), a local area network (LAN), or the Internet.

Server 104 may be a web server computing device such as is well known. Server 104 selectively communicates with user access device 106 via network 102. In one embodiment, user access device 106 is a computing device such as a laptop, notebook, desktop, or handheld computing device. User access device 106 may include a display and one or more input devices such as a keyboard and/or pointing device or other well known input device. In one embodiment, user access device 106 is capable of running a Web browser, as is well known.

Further, server 104 may communicate with information database 110 via connection 108. Although depicted in FIG. 1 as physically separate devices, in some embodiments server 104 and information database 110 exist on one physical computing machine and/or are embodied in one software application. Further, embodiments are possible in which network 102, user access device 106, server 104, and information database 110 are comprised within one physical computing machine and/or are embodied in one or more software applications. Further, server 104 and/or database 110 could include more than one server 104 and/or database 110. Also, embodiments are possible in which user access device 106 communicates directly with database 110.

Information database 110 is generally a relational database management system (RDBMS) that includes information about a hierarchy of data. Such a hierarchy of data generally comprises category data, as well as item data, and is described in more detail below with reference to FIG. 2. In general, category data includes data identifying various categories of information, each category being represented by a node in the hierarchy. Item data comprises data relating to items within categories, each item also being represented by a node in the hierarchy.

Information database 110 may also contain at least one label for each node. Each node may have associated with it in database 110 a descriptive label which provides information concerning the category or item associated with the node, and also a shorter label which provides less information about a node than the descriptive label and relies on the place in which a node is displayed in a hierarchy to convey further information about the node. The shorter label may simply be a truncated version of the descriptive label, and can be used when the hierarchy in which a node is presented provides at least a portion of the information described by the descriptive label.

In general, server 104, user access device 106, and database 110 may each include any one of a number of well known computing devices, including, without limitation, a computer workstation, a desktop, notebook, laptop, or handheld computer, or some other known computing device, such as a Java-enabled cellular telephone or similar device. Computing devices such as the foregoing may employ any of a number of well known computer operating systems, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system.

Further, server 104, user access device 106, and database 110 may each include instructions executable by one or more computing devices such as those listed above. Such instructions may be compiled or interpreted from computer programs created using a variety of well known programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Referring back to database 110, an RDBMS generally employs the known Structured Query Language (SQL) in addition to a language for creating, storing, editing, and executing stored procedures. However, it is to be understood that database 110 may be some other kind of database such as a hierarchical database, a set of files, an application database in a proprietary format, etc. In addition to RDBMS software, database 110 generally includes a computing device employing a computer operating system such as one of those mentioned above, and is accessed via network 102 and/or connections 108 in any one or more of a variety of well known manners.

User 120 may interact with information system 100 to obtain information from information database 110 in any number of ways, including, for example, via user access device 106 over connection 108. User 120 may also obtain information by interacting with information system 100 through various well known information technology mechanisms, such as software applications that are configured or adapted to interface with information system 100. Such interfacing applications can interact with information system 100 in both an automated and manual manner, engaging in batch, real-time, schedule, and ad-hoc interactions.

User 120 may be any person, organization, or other entity that uses database 110 to search and display information in a hierarchical format. User 120 may provide a condition 122, e.g., a search request, which is submitted to information system 100 via user access devices 106 over connections 108. Such conditions 122 by users 120 may contain one or more query term(s) 123 relating to attributes of item data desired by user 120. Such query term(s) 123 might include, for example, a desired provider name attribute, a desired category attribute, a desired geographic attribute, or a keyword relating to specific vertical content. Vertical content may include a variety of industry-specific information, such as, for example, the brands or model numbers of laptop computers sold by a consumer electronics store, the menu items served by an Italian restaurant, the frequent flyer programs accepted by a travel agency, etc. Conditions 122 may also be provided in other ways, e.g., by a software application.

Although only one user 120 is displayed in FIG. 1, it is anticipated that many, potentially millions, of different users 120 may submit conditions 122 and receive responses using information system 100. The capacity of information system 100 is only limited by the information technology architecture that supports the functionality of information system 100 (for example, the number of servers 104 and/or information databases 110).

Hierarchy

Figure 2:
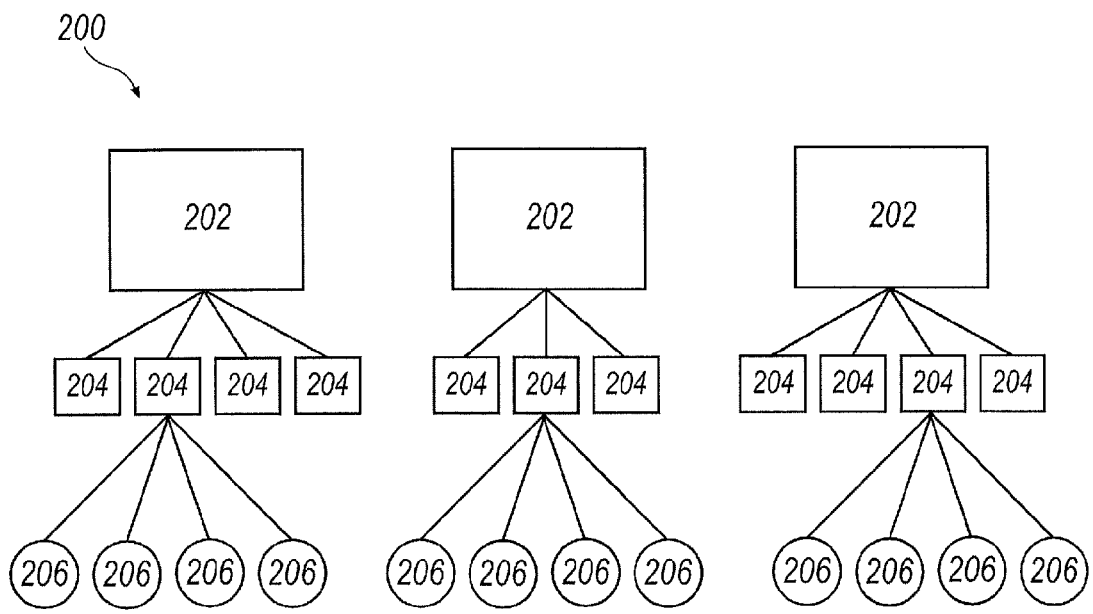
FIG. 2 illustrates a hierarchical category index according to an embodiment.

FIG. 2 depicts a hierarchy 200 according to an embodiment. Hierarchy 200 is generally stored in information database 110, and in one embodiment may be a tree having any number of levels and any number of nodes, each parent node having any number of child nodes. Of course, in practice the size of hierarchy 200 is limited by computing resources, the utility of hierarchy 200 as it grows larger (both in terms of its number of nodes and number of levels), etc.

At a top level of hierarchy 200 are one or more top level categories of information, represented by nodes 202. Each top level node 202 may have one or more children, or sub-nodes 204. Each sub-node 204 in turn may have one or more children, or sub-nodes 206. In turn, sub-nodes 206 may have their own sub-nodes, continuing hierarchy 200 potentially indefinitely. Each node 202 and sub-node 204 and 206 may be associated with a category of information and/or one or more items of information. Categories of information are hierarchically arranged as is reflected by hierarchy 200 and accordingly sub-nodes 204 and 206 are generally subcategories of categories of information. Generally, nodes 202, 204, and 206 include pointers, or other references such as are known for associating data objects, to items and/or categories of information. An example of a category of information associated with a node is "Antiques." An example of an item of information associated with a node is a particular antique retailer. Other examples of categories of information include "pets," "restaurants," "automobiles," "trigonometry," etc. Other examples of items of information include names of pet stores, names of pets, names of restaurants, names of automobile dealers, information about trigonometry, etc.

Figure 3:
FIG. 3 illustrates a portion of a graphical user interface showing a hierarchy prior to modifying, according to an embodiment.

FIG. 3 illustrates an exemplary hierarchy 300. It is to be understood that hierarchy 300 may be a portion of a larger hierarchy. Hierarchy 300 is shown in FIG. 3 comprising two top level nodes 302a and 302b. Top level node 302a has a sub-node 304a that in turn has a plurality of sub-nodes 306a and 306b, which in turn each have a sub-node 308a and 308b, respectively. Similarly, top-level node 302b has two sub-nodes 304b and 304c, which each have respective sub-nodes 306c and 306d. Sub-node 306d in turn has a sub-node 308c, which itself has a sub-node 310. Each node or sub-node of hierarchy 300 is displayed with a short label associated with that node or sub-node, because further information regarding the node is generally readily apparent from its place in hierarchy 300.

Figure 5:
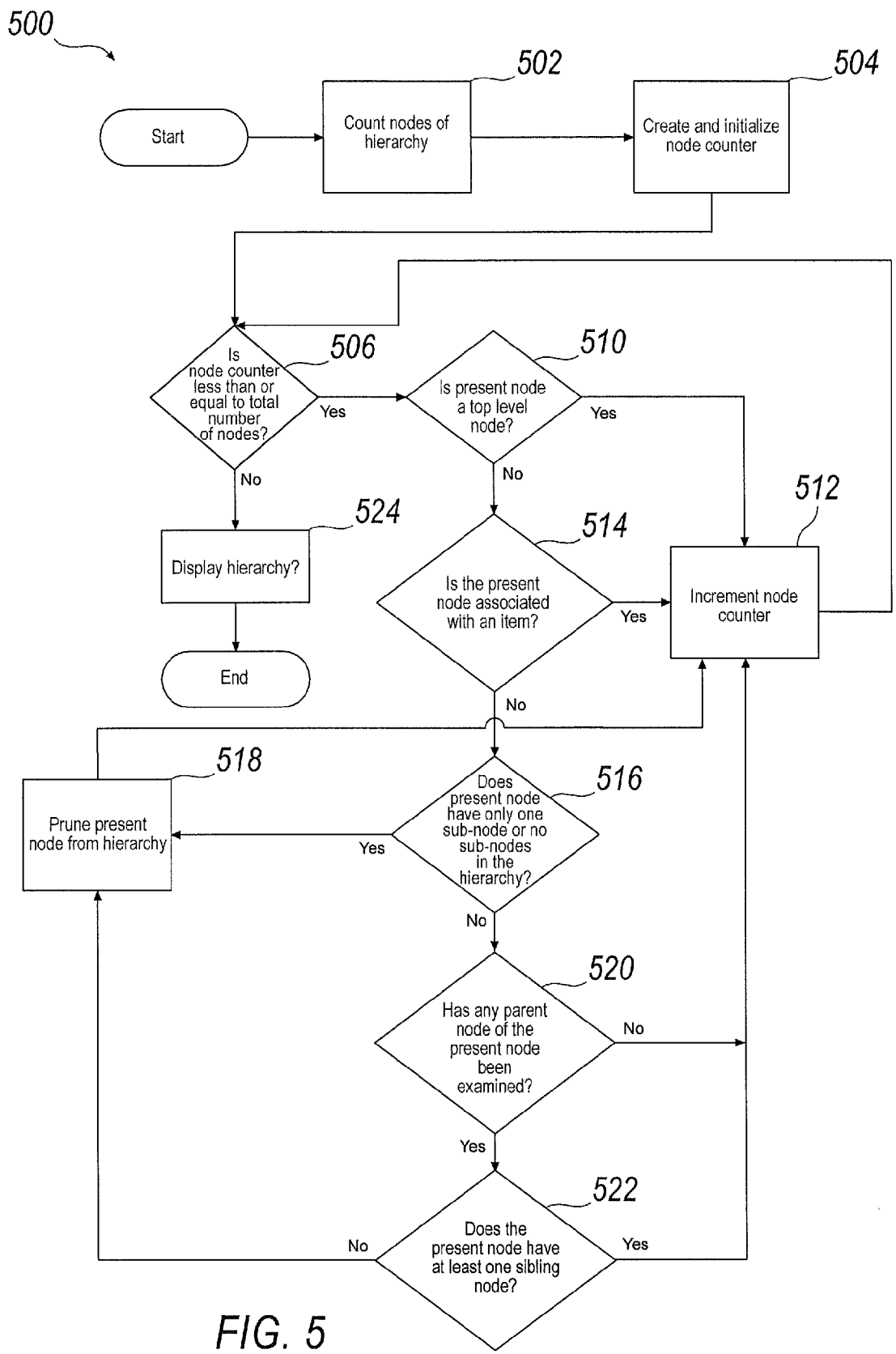
FIG. 5 illustrates an exemplary process for modifying a hierarchy according to an embodiment.

FIG. 4 illustrates a result of process flow 500 illustrated in FIG. 5, representing modified display 300' of the hierarchy 300 illustrated in FIG. 3, according to an embodiment. Top-level nodes 302a and 302b remain, while sub-nodes 304a, 304b, 304c, 306a, 306b, 306d, 308c have been removed from the display of hierarchy 300. Sub-nodes 308a, 308b, 306c, 310 remain, and are displayed with a descriptive label associated with each node 308a, 308b, 306c, 310. The descriptive labels provide context regarding the place in hierarchy 300 of each node 308a, 308b, 306c, 310 that may not be evident after pruning sub-nodes 304a, 304b, 304c, 306a, 306b, 306d, 308c from modified display 300'. For example, the label for node 306c now reads "Coin Dealers' Supplies Wholesale" rather than "Coin Dealers' Supplies" because its parent node 304b labeled "Wholesale & Manufacturers" has been pruned from the hierarchy. The organization or classification of each node and sub-node in a hierarchy is thus apparent to user 120 even when parent nodes which indicate organization are pruned, since the descriptive labels may generally contain similar information. Advantageously, modified display 300' of hierarchy 300, such as illustrated in FIG. 4, allows a user to quickly and efficiently determine which category or categories of information and/or items of information in hierarchy 300 are of greatest interest.

Exemplary Process Flow

One embodiment is implemented at least partly in a computer program running on server 104, so that much of the processing required to support hierarchy modification as described herein is performed on server 104, generally in conjunction with an Internet browser application running on user access device 106. However, embodiments are possible, even likely, employing various combinations of computer languages and protocols. Further, much of the processing described herein as taking place on server 104 could take place on network 102 and vice-versa. Also, intelligent hierarchy collapsing could be linked to dynamic applications via network 102. Such implementations could use a variety of technologies, programming languages and/or scripting languages such as Java Server Pages, Active Server Pages, PERL, C, C++, Microsoft® .NET, HTML, DHTML, JavaScript, etc. alone or in combination one server 104 and/or user access device 106.

Hierarchy 300 illustrated in FIG. 3 may represent a search result from a query 123 of information database 110 by user 120, or any other portion or sub-portion of information database 110 in a hierarchical arrangement which may be selected by or provided to user 120.

FIG. 5 illustrates a process 500 for modifying a hierarchy 300, according to an embodiment. In general, each node of hierarchy 300 may be examined to determine which nodes and sub-nodes can be pruned from hierarchy 300 without compromising, and in fact enhancing, the ability of user 120 to locate information and/or categories of information of interest. Nodes of hierarchy 300 may be examined in any order that may be convenient, such as from top to bottom, or by node category (i.e., all top-level nodes 302, then all sub-nodes 304, 306, etc.), etc. Process 500 illustrated and described herein includes an examination of nodes of hierarchy 300 in a sequential, top-to-bottom order.

In step 502, all nodes of hierarchy 300 are counted, i.e., the total number of nodes in hierarchy 300 is determined, and the result is stored, e.g., in a computer memory.

Next, in step 504, a node counter is created and stored, e.g., in a computer memory, having as an initial value the integral value of one. The node counter is generally an integer variable stored in memory of server 104.

Next, in step 506, the value of the node counter created in step 504 is compared to the total number of nodes in hierarchy 300, determined in step 502. If the value of the node counter is less than or equal to the total number of nodes in hierarchy 300, then process 500 continues to step 510. Otherwise, process 500 continues to step 524, where the hierarchy is displayed without further examination of any nodes. It should be apparent that the purpose of step 506 is to ensure that every node in hierarchy 300 is examined. Of course, embodiments are possible in which a sub-set, but not all, of the nodes in hierarchy 300 are examined.

Next, in step 510, a node is identified for examination (sometimes referred to below as "the present node"), and it is determined whether the present node is a top level node 302, i.e., whether the present node has a parent node. According to an embodiment, if the present node has no parent, the present node is not pruned from hierarchy 300. In such event, process 500 proceeds to step 512. As should be apparent, top-level nodes 302 are generally not pruned from hierarchy 300. If the present node is not a top-level node, process 500 proceeds to step 514.

Embodiments are possible in which step 510 is not practiced, or is practiced differently from the description above. For example, where hierarchy 300 includes a top level node that is associated with a category and that has only one sub-node, or where all nodes in hierarchy 300 have the same parent node, i.e., a top level node 302, it may be desirable to prune the top level category such that the node(s) is/are displayed without top level node 302.

In step 512, the node counter created in step 504 is incremented by a value of one, and then process 500 returns to step 506. Further, optionally in step 512, a flag associated with the present node is set to indicate that it has been examined. This flag may also be associated with any child nodes of the present node to indicate that their parent node has been examined.

In step 514, it is determined whether the present node is associated with an item of information instead of or in addition to a category of information in hierarchy 300. If the present node is associated with an item of information instead of or in addition to a category of information, process 500 proceeds to step 512. If, on the other hand, the present node is not associated with an item of information, then process 500 continues to step 516. The determination of step 514 may be made, e.g., by determining whether the present node includes a pointer or other reference to a category of information and/or one or more pointers or other references to items of information.

In step 516, it having been determined in step 514 that the present node is not associated with at least one item, it is determined whether the present node has only one child or sub-node, or the present node has no sub-nodes, in hierarchy 300. If the present node has only one sub-node or no sub-nodes, process 500 proceeds to step 518 to prune the present node from the hierarchy. Otherwise, process 500 may continue to step 520.

In step 518, it having been determined in either step 516 or 522 that the present node is some way redundant or superfluous in hierarchy 300, the present node is pruned from hierarchy 300, and process 500 returns to step 512. It will be understood that any children of the present node must be re-configured to point to the parent of the present node, which becomes the parent of such children. Further, optionally in step 518, any children, or sub-nodes, of the present node are identified, and a second flag associated with each child of the present node is set to indicate that its parent, i.e., the present node, has been eliminated.

Next, in step 520, it is determined whether the parent of the present node has been examined. Such a determination may be made, for example, by checking the flag that may have been associated with the present node when its parent was examined, as described above with reference to step 512. If the parent of the present node has been examined, process 500 continues to step 522. Otherwise, process 500 returns to step 512.

In step 522, it is determined whether the present node currently has any sibling nodes in hierarchy 300. If yes, process 500 proceeds to step 512, and the present node is not pruned from hierarchy 300. Otherwise, process 500 continues to step 518.

Steps 520 and 522 are optional, and may be excluded from certain embodiments.

In step 524, which generally occurs after step 506, each node or sub-node that has not been pruned from hierarchy 300 is displayed to user 120, e.g., as illustrated in FIG. 4. User 120 may thus view a modified display 300' of a hierarchy 300 of information that not only provides context for each item which enables quickly scanning the hierarchy for relevant information, but also takes up a minimal amount of space on any screen user 120 may be using to view the hierarchy. Any sub-nodes may be displayed with a longer, more descriptive name associated with that sub-node to provide context that may be lost when any higher-level nodes or sub-nodes are pruned from the hierarchy. For example, if a node in modified hierarchy has a flag associated with it indicating that a parent node has been pruned, the descriptive label may be displayed for that node in place of the short label. The end result of process 500 is generally a compacting of hierarchy 300 with greater detail provided for the description of each node and sub-node.

Figure 6:
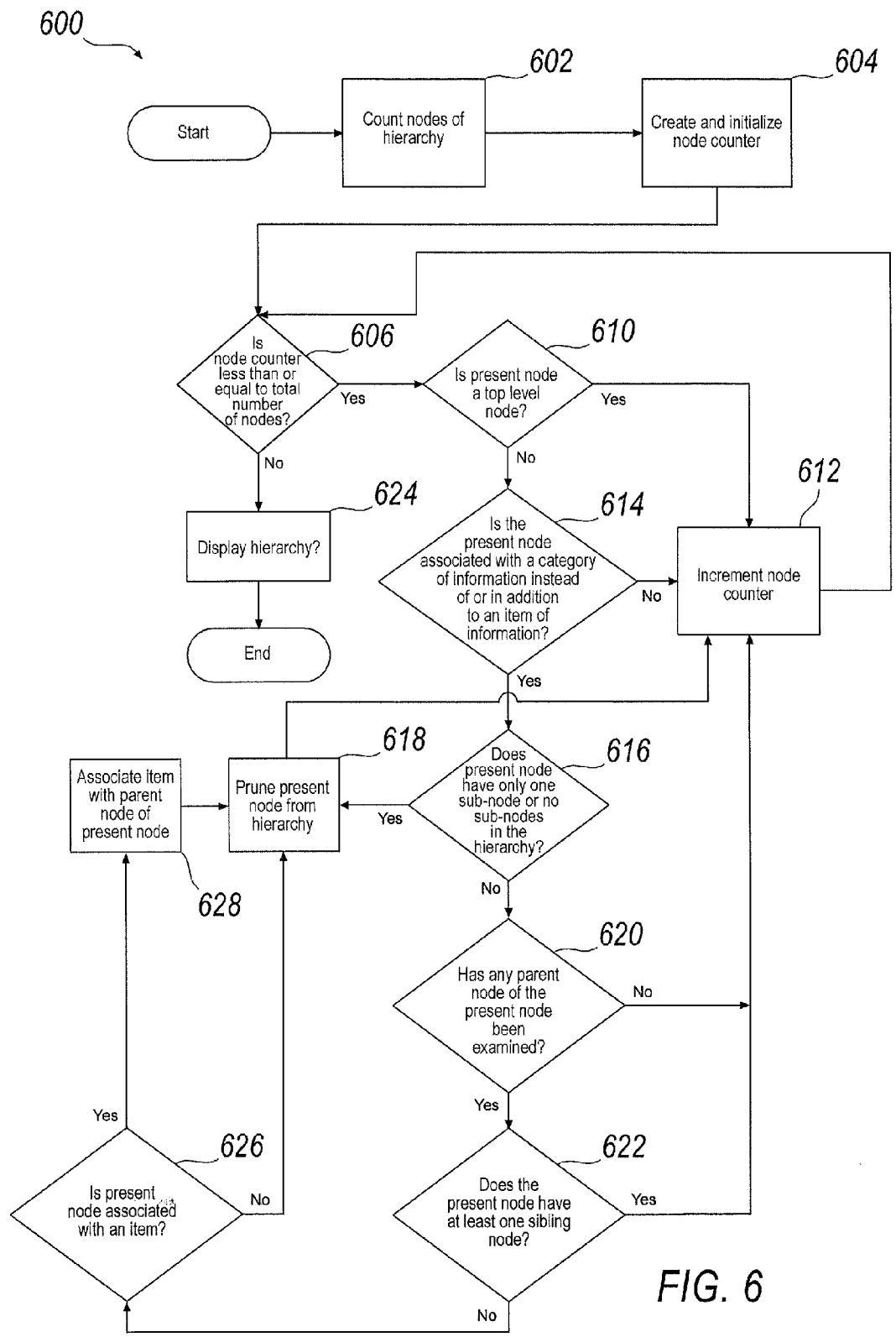
FIG. 6 illustrates a process for modifying a hierarchy, according to an alternative embodiment.

FIG. 6 illustrates a process 600 for modifying a hierarchy 300, according to an alternative embodiment. As with process 500, nodes of hierarchy 300 may be examined in any order that may be convenient, such as from top to bottom, or by node category (i.e., all top-level nodes 302, then all sub-nodes 304, 306, etc.), etc. Process 600 illustrated and described herein includes an examination of nodes of hierarchy 300 in a sequential, top-to-bottom order.

Steps 602, 604, 606, 610, and 612 may generally be performed in substantially the same manner as described above in steps 502, 504, 506, 510, and 512, respectively, of process 500. Step 614 is a modified version of step 514 of process 500.

In step 614, it is determined whether the present node is associated with a category of information (i.e., category or subcategory) instead of or in addition to an item of information in hierarchy 300. If the present node is not associated with a category of information instead of or in addition to an item of information, but is only associated with an item of information, process 600 proceeds to step 612. If, on the other hand, the present node is associated with a category of information instead of or in addition to an item of information, then process 600 continues to step 616. The determination of step 614 may be made, e.g., by determining whether the present node includes a pointer or other reference to a category of information and/or one or more pointers or other references to items of information.

Steps 616, 618, 620, and 622 may generally be performed in substantially the same manner as described above in steps 516, 518, 520, and 522, respectively, of process 500. Steps 626 and 628 have been added to process 600.

In step 626, it is determined whether the present node is associated with an item, in addition to any category that may be associated with the present node. If yes, process 600 proceeds to step 628. If no, process 600 proceeds from step 626 to step 618, where the present node is pruned from the hierarchy.

In step 628, any item associated with the present node is disassociated from the present node and is then associated with the parent node of the present node, e.g., by resetting pointers to such items. Process 600 then proceeds to step 618, where the present node is pruned from the hierarchy.

Step 624 may generally be performed in substantially the same manner as described above in step 524 of process 500. The end result of process 600 is generally a compacting of hierarchy 300 with greater detail provided for the description of each node and sub-node.

Conclusion

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

In general, the foregoing description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

What is claimed is:

1. A method, comprising:
    selectively pruning nodes from a hierarchy of nodes using a computing device, each node being at least one of (a) associated with at least one item included in a set of items and (b) associated with one of a plurality of categories of information, the pruning including:
    determining whether a present node in the hierarchy of nodes is associated with one of the plurality of categories of information, and
    if the present node is associated with one of the plurality of categories of information:
        (i) determining whether the present node has one and only one child node or no child nodes, and further determining, if the present node has only one child node, whether the child node is associated with a category of the one of the plurality of categories of information or a subcategory of the one of the plurality of categories of information,
        (ii) if the present node has only one child node, and if the child node is associated with the category or subcategory, associating the one child node with a parent node of the present node, and
        (iii) pruning the present node from the hierarchy if one of (a) the present node has no child nodes, and (b) the present node has only one child node, the only one child node being associated with the category or the subcategory.

2. The method of claim 1, further comprising retrieving the hierarchy of nodes from a data store in response to a search request for items.

3. The method of claim 1, further comprising:
    receiving categorized search results in response to a search request for items; and
    creating the hierarchy of nodes based on the received categorized search results.

4. The method of claim 1, further comprising providing the hierarchy for display after selectively pruning the hierarchy in response to a search request for items.

5. The method of claim 1, further comprising preventing the present node from being pruned if the present node is at least one of (a) determined to be a top level node, (b) determined to have a sibling node, and (c) determined to have a parent node that was examined for pruning.

6. The method of claim 1, further comprising providing a revised description of at least one node that is a descendent of the present node that was pruned, the revised description providing context regarding placement in the hierarchy of the at least one node.

7. A tangible computer readable medium embodying computer executable instructions, the instructions comprising instructions for:
    selectively pruning nodes from a hierarchy of nodes using a computing device, each node being at least one of (a) associated with at least one item included in a set of items and (b) associated with one of a plurality of categories of information, the pruning including at least one of:
        (i) determining whether a present node in a hierarchy of nodes is associated with any of the items in the set of items, and if the present node is not associated with any of the items in the set of items, pruning the present node from the hierarchy if one of (a) the present node is determined to have no child nodes, and (b) the present node is determined to have only one child node and the child node is associated with one of the plurality of categories of information, and
        (ii) determining whether a present node in the hierarchy of nodes is associated with one of the categories of information, and if the present node is associated with one of the plurality of categories of information:
            (1) determining whether the present node has one and only one child node or no child nodes, and further determining, if the present node has only one child node, whether the child node is associated with a category of the one of the plurality of categories of information or a subcategory of the one of the plurality of categories of information,
            (2) if the present node has only one child node, and if the child node is associated with the category or subcategory, associating the one child node with a parent node of the present node, and
            (3) pruning the present node from the hierarchy if one of (a) the present node has no child nodes, and (b) the present node has only one child node, the only one child node being associated with the category or the subcategory.

8. The computer readable medium of claim 7, further comprising instructions for retrieving the hierarchy of nodes from a data store in response to a search request for items.

9. The computer readable medium of claim 7, further comprising instructions for:
    receiving categorized search results in response to a search request for items; and
    creating the hierarchy of nodes based on the received categorized search results.

10. The computer readable medium of claim 7, further comprising instructions for providing the hierarchy for display after selectively pruning the hierarchy in response to a search request for items.

11. The computer readable medium of claim 7, further comprising instructions for preventing the present node from being pruned if the present node is (a) determined to be a top level node, (b) determined to have a sibling node, and (c) determined to have a parent node that was examined for pruning.

12. The computer readable medium of claim 7, further comprising instructions for providing a revised description of at least one node that is a descendent of the present node that was pruned, the revised description providing context regarding placement in the hierarchy of the at least one node.

* * * * *